(12) United States Patent
Kato et al.

(10) Patent No.: US 9,203,994 B2
(45) Date of Patent: Dec. 1, 2015

(54) IMAGE FORMING APPARATUS

(71) Applicant: CANON KABUSHIKI KAISHA, Tokyo (JP)

(72) Inventors: Hiroshi Kato, Odawara (JP); Atsushi Ogata, Mishima (JP); Daisuke Kaneko, Suntou-gun (JP); Kazushi Ino, Suntou-gun (JP); Tomoyuki Iwakoshi, Suntou-gun (JP); Ichiro Yasumaru, Mishima (JP); Masaru Aoki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/384,221

(22) PCT Filed: May 7, 2013

(86) PCT No.: PCT/JP2013/063236
§ 371 (c)(1),
(2) Date: Sep. 10, 2014

(87) PCT Pub. No.: WO2013/168817
PCT Pub. Date: Nov. 14, 2013

(65) Prior Publication Data
US 2015/0109645 A1    Apr. 23, 2015

(30) Foreign Application Priority Data

May 7, 2012    (JP) ................................. 2012-106151

(51) Int. Cl.
*H04N 1/04*    (2006.01)
*H04N 1/00*    (2006.01)
(Continued)

(52) U.S. Cl.
CPC ......... *H04N 1/00525* (2013.01); *G03G 15/602* (2013.01); *H04N 1/0058* (2013.01);
(Continued)

(58) Field of Classification Search
CPC .............. B65H 9/00; B65H 3/06; B65H 9/04; B65H 1/08; G03G 15/60; G03G 2215/00185;
G03G 15/23; G03G 15/6538; H04N 1/00588; H04N 1/0061; H04N 1/00628; H04N 1/00681; H04N 1/00694; H04N 1/00745
USPC ........ 358/498, 474, 49, 1.15, 497; 271/10.11, 271/304, 3.14, 3.19, 902, 10.03, 186, 227, 271/229, 265.01, 270, 3.01, 3.04, 3.05, 3.13
See application file for complete search history.

(56) References Cited

U.S. PATENT DOCUMENTS 4,761,001 A * 8/1988 Hayakawa et al. .......... 271/3.01
5,003,627 A * 3/1991 Wataya et al. ................ 382/305
(Continued)

FOREIGN PATENT DOCUMENTS

JP       0591263 A    4/1993
JP       10181955 A   7/1998
(Continued)

OTHER PUBLICATIONS

International Preliminary Report on Patentability issued in International Application No. PCT/JP2013/063236 dated Nov. 11, 2014.

*Primary Examiner* — Negussie Worku
(74) *Attorney, Agent, or Firm* — Fitzpatrick, Cella, Harper & Scinto

(57) ABSTRACT

An image forming apparatus including: a sheet feeding portion configured to feed a sheet to a sheet conveying path; an image forming portion configured to form an image on the sheet; a sheet discharging portion configured to discharge the sheet; a sheet re-conveying path configured to guide the sheet on which the image has been formed to the sheet conveying path again; an original feeding portion configured to feed an original; an original feeding path configured to guide the original to the sheet re-conveying path; an image reading portion configured to read an image of the original; an original discharging path configured to guide the original guided along the sheet re-conveying path to an original discharging portion; and an original conveying portion configured to convey the original which has been guided along the original feeding path toward the original discharging path.

23 Claims, 8 Drawing Sheets

(51) Int. Cl.
*G03G 15/00* (2006.01)
*H04N 1/12* (2006.01)

(52) U.S. Cl.
CPC ....... *H04N1/00578* (2013.01); *H04N 1/00596* (2013.01); *G03G 2215/00189* (2013.01); *H04N 1/12* (2013.01); *H04N 2201/0091* (2013.01)

(56) References Cited

U.S. PATENT DOCUMENTS

| | | | |
|---|---|---|---|
| 5,018,716 A * | 5/1991 | Yoshida et al. | 271/227 |
| 5,173,953 A * | 12/1992 | Wataya et al. | 382/305 |
| 5,369,480 A | 11/1994 | Isobe | |
| 5,799,237 A * | 8/1998 | Ueda et al. | 399/367 |
| 5,833,227 A * | 11/1998 | Choho et al. | 271/10.03 |
| 6,382,614 B1 | 5/2002 | Fukatsu et al. | |
| 6,385,433 B1 * | 5/2002 | Sawada | 399/405 |
| 6,561,503 B1 | 5/2003 | Ogata et al. | |
| 6,826,374 B2 | 11/2004 | Kato et al. | |
| 6,973,285 B2 | 12/2005 | Sekiyama et al. | |
| 7,011,306 B2 | 3/2006 | Kato et al. | |
| 7,505,703 B2 | 3/2009 | Akita et al. | |
| 7,597,311 B2 | 10/2009 | Kawata et al. | |
| 7,874,558 B2 | 1/2011 | Ogata et al. | |
| 8,434,753 B2 | 5/2013 | Fukatsu et al. | |
| 8,870,182 B2 | 10/2014 | Ogata et al. | |
| 8,888,093 B2 | 11/2014 | Ino | |
| 2004/0027620 A1 | 2/2004 | Tseng | |
| 2005/0129439 A1 * | 6/2005 | Asano | 399/401 |
| 2011/0156336 A1 * | 6/2011 | Agata et al. | 271/3.19 |
| 2013/0293909 A1 | 11/2013 | Endo et al. | |
| 2014/0320877 A1 | 10/2014 | Kaneko et al. | |
| 2014/0320939 A1 | 10/2014 | Ogata et al. | |
| 2014/0320940 A1 | 10/2014 | Ino et al. | |
| 2014/0321897 A1 | 10/2014 | Ogata et al. | |
| 2014/0327921 A1 | 11/2014 | Ogata et al. | |

FOREIGN PATENT DOCUMENTS

| | | |
|---|---|---|
| JP | 2006232467 A | 9/2006 |
| JP | 2007076782 A | 3/2007 |

* cited by examiner

IMAGE FORMING APPARATUS

This application is a continuation of International Application No. PCT/JP2013/063236, filed May 7, 2013, which claims priority to Japanese Application No. 2012, 106151, filed on May 7, 2012.

TECHNICAL FIELD

The present invention relates to an image forming apparatus including an image reading portion configured to read an image of an original, and an image forming portion configured to form the image on a sheet.

BACKGROUND ART

Conventional image forming apparatus such as a copying machine, a scanner, and a facsimile machine may include an image reading device configured to read an image of an original. As the image reading device, there is known an image reading device configured to read an image of an original by an image reading portion while conveying the original by an automatic original feeder (auto document feeder (ADF)).

On the other hand, the image forming apparatus forms an image based on information on the image that is read by the image reading device. For example, when forming images on both surfaces of a sheet, an image forming portion forms an image on one surface (first surface) of the sheet, and then the sheet is conveyed to a sheet re-conveying path so that the sheet is re-conveyed to the image forming portion. The image forming portion then forms an image on an opposite surface (second surface) of the sheet.

There is proposed such a configuration that the sheet re-conveying path of the image forming apparatus is shared with an original conveying path of the image reading device and the image reading portion is arranged in the sheet re-conveying path (PTL 1). When reading an image of an original in the configuration, the original is conveyed to the sheet re-conveying path of the image forming apparatus, and the image reading portion reads the image of the original.

In the apparatus disclosed in PTL 1, however, the width of the image forming apparatus is large in a horizontal direction thereof. Specifically, even when the sheet re-conveying path of the image forming apparatus is shared with the original conveying path of the image reading device so as to downsize the image forming apparatus, the width of the image forming apparatus increases under the mere arrangement of the image reading portion in the sheet re-conveying path. As a result, the image forming apparatus cannot be downsized efficiently.

CITATION LIST

Patent Literature

PTL 1: Japanese Patent Application Laid-Open No. 2006-232467

SUMMARY OF INVENTION

The present invention has been made in view of the above-mentioned circumstances, and therefore provides an image forming apparatus which may further be downsized by enhancing space utilization efficiency.

According to an embodiment of the present invention, there is provided an image forming apparatus, including:

a sheet feeding portion configured to feed a sheet to a sheet conveying path;

an image forming portion configured to form an image on the sheet which is guided along the sheet conveying path;

a sheet discharging portion configured to discharge the sheet on which the image has been formed by the image forming portion;

a sheet re-conveying path configured to guide again, to the sheet conveying path, the sheet on which the image has been formed by the image forming portion;

an original feeding portion provided above the image forming portion, and configured to feed an original;

an original feeding path configured to guide, to the sheet re-conveying path, the original which has been fed by the original feeding portion;

an image reading portion configured to read an image of the original which has been fed by the original feeding portion;

an original discharging portion provided above the image forming portion, and configured to discharge the original which has been read by the image reading portion;

an original discharging path configured to guide, to the original discharging portion, the original which has been guided along the sheet re-conveying path; and an original conveying portion configured to convey the original which has been guided along the original feeding path toward the original discharging path.

Further features of the present invention will become apparent from the following description of exemplary embodiments with reference to the attached drawings.

DESCRIPTION OF EMBODIMENTS

Figure 1:
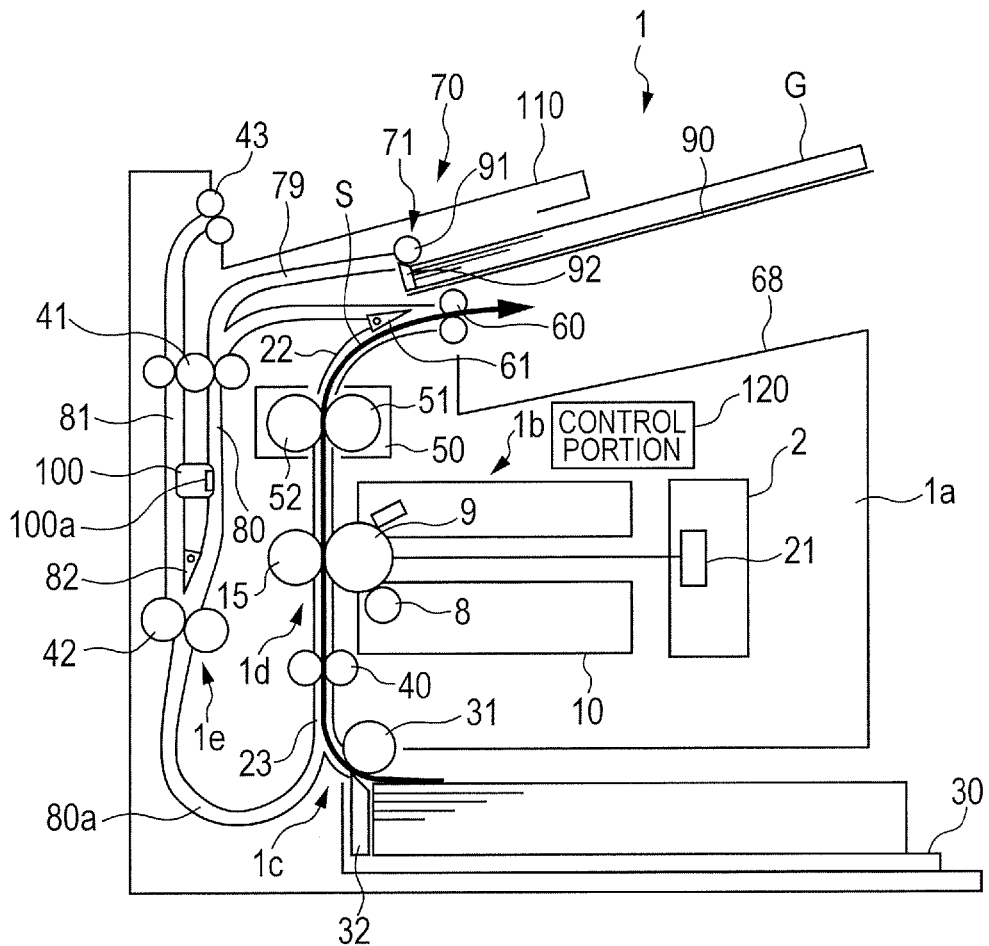
FIG. 1 is a diagram illustrating a schematic configuration of a laser beam printer as an example of an image forming apparatus according to a first embodiment of the present invention.

In the following, exemplary embodiments of the present invention will be described in detail with reference to the attached drawings. FIG. 1 is a diagram illustrating a schematic configuration of a laser beam printer 1 as an example of an image forming apparatus according to a first embodiment of the present invention. In FIG. 1, the laser beam printer 1 is configured to form images on both surfaces of a sheet S, and has a laser beam printer main body (hereinafter referred to as "printer main body") 1a as a main body of the image forming apparatus. An image reading device 70 is configured to read images on both front and back surfaces of an original G.

The printer main body 1a includes an image forming portion 1b configured to form an image on the sheet S, a sheet feeding portion 1c configured to feed the sheet S, a fixing portion 50, and a sheet conveying device 1e configured to convey the sheet S, on one surface of which an image has been formed, to the image forming portion 1b, again.

The image forming portion 1b includes a removable process cartridge 10 which integrally includes a photosensitive drum 9 serving as an image bearing member and a process unit such as a developing sleeve 8. Further, the image forming portion 1b includes a transfer portion 1d configured to transfer, onto the sheet S, a toner image formed on the photosensitive drum 9. Still further, the image forming portion 1b includes a laser exposure device 2 configured to expose a surface of the photosensitive drum 9 to light so as to form an electrostatic latent image on the photosensitive drum 9.

The sheet feeding portion 1c includes a sheet feeding tray 30 on which the sheets S are stacked, a feed roller 31 configured to feed the sheets S on the sheet feeding tray 30, and a separation portion 32 having a separation pad (not shown) arranged on a top surface thereof so as to separate the sheets S fed by the feed roller 31 one by one. The transfer portion 1d is formed of the photosensitive drum 9 and a transfer roller 15 which is brought into pressure contact with the photosensitive drum 9 to form a transfer nip therebetween, and is configured to transfer, onto the sheet S, the toner image formed on the photosensitive drum 9 when the sheet S passes through the transfer nip. Note that, a sheet feeding path 23 is provided between the transfer portion 1d and the sheet feeding portion 1c, and is configured to convey the sheet S fed by the sheet feeding portion 1c to the transfer portion 1d. A conveyance roller pair 40 is arranged in the sheet feeding path 23.

The sheet conveying device 1e includes a forward and reverse rotatable discharge roller pair 60 serving as a sheet discharging portion configured to discharge the sheet S, and a re-conveying path (sheet re-conveying path) 80 configured to re-convey the sheet S to the image forming portion 1b in a state in which the surfaces of the sheet S are reversed through the reverse rotation of the discharge roller pair 60. A sheet discharge conveyance path 22 is provided between the fixing portion 50 and the discharge roller pair 60. The sheet feeding path 23 and the sheet discharge conveyance path 22 serve as a sheet conveying path. Further, the sheet conveying device 1e includes conveyance roller pairs 41 and 42 provided in the re-conveying path 80 and configured to convey the sheet S to the conveyance roller pair 40.

In the embodiment, the conveyance roller pair 42 located on the downstream side is rotatable in the forward and reverse directions. The conveyance roller pair 42 serves as an original conveying portion configured to convey the original G forwardly and reversely. Further, the re-conveying path 80 is branched off from the sheet discharge conveyance path 22 which is provided between the fixing portion 50 and the discharge roller pair 60, and a first switching member 61 is arranged at a branch point between the re-conveying path 80 and the sheet discharge conveyance path 22. When the first switching member 61 is switched and the discharge roller pair 60 is rotated selectively in the forward and reverse directions, the sheet S may be conveyed toward the re-conveying path 80 selectively.

The image reading device 70 includes an image reading portion 100 configured to read an image of the original G, and an automatic original feeder (ADF) 71 configured to convey the original G toward the image reading portion 100. The image reading portion 100 is movable between a position for reading an image on a first surface of the original G passing along the re-conveying path 80 and a position for reading an image on a second surface of the original G passing along a discharge conveyance path 81 described later. With the image reading portion 100 as described above, the image reading device 70 may read images on both front and back surfaces of the original G. Note that, the image reading portion 100 has an image reading surface 100a serving also as a cover configured to prevent entry of a foreign matter.

Further, the image reading device 70 includes an original feeding path 79 configured to convey the original G fed from a pickup roller 91 to the re-conveying path 80. The re-conveying path 80 includes a common conveying portion which guides the sheet and the original. The image reading device 70 includes the discharge conveyance path 81 serving as an original discharging path which is branched off from the re-conveying path 80 on the upstream side with respect to the conveyance roller pair 42. Along the discharge conveyance path 81, the original G of which the image on the first surface has been read is conveyed to a discharged original stacking portion 110. Further, a second switching member 82 is provided at a branch point between the re-conveying path 80 and the discharge conveyance path 81. When the second switching member 82 is switched and the conveyance roller pair 42 is rotated in the reverse direction, the original G of which the image on the first surface has been read may be conveyed to the discharge conveyance path 81.

The automatic original feeder 71 includes an original tray 90 on which the originals G are placed, and the pickup roller 91 serving as an original feeding portion configured to feed originals G, which are stacked on the original tray 90 with their image surfaces facing upward, sequentially one by one. The pickup roller 91 is arranged above the image forming portion 1b and the re-conveying path 80. Further, the automatic original feeder 71 includes a separation portion 92 having a separation pad (not shown) arranged on a top surface thereof so as to separate the originals G fed by the pickup roller 91 one by one, and the discharged original stacking portion 110 located above the original tray 90.

Figure 2:
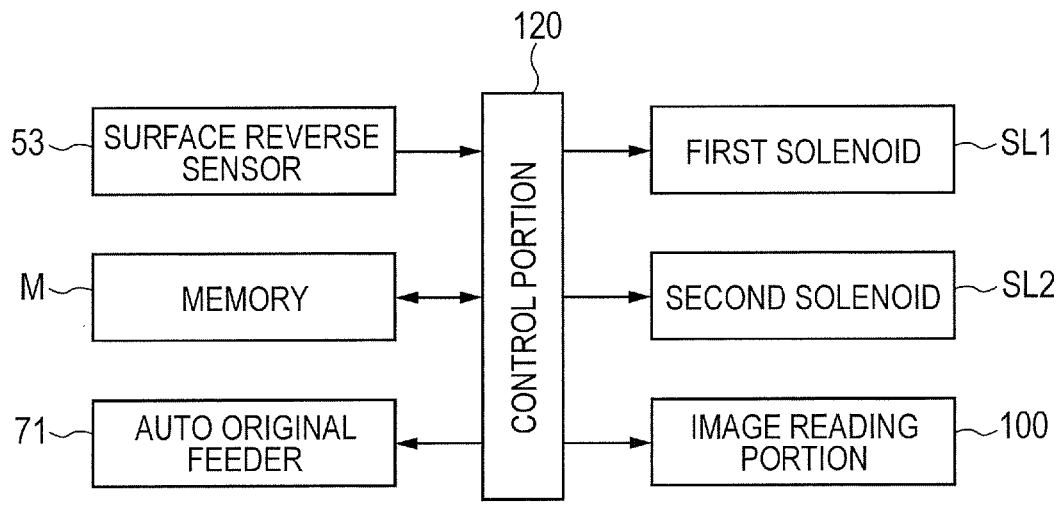
FIG. 2 is a control block diagram of the laser beam printer.

Note that, in FIG. 1, a control portion 120 controls the image forming operation of the printer main body 1a and the image reading operation of the image reading device 70. As illustrated in FIG. 2, a first solenoid SL1 configured to drive the first switching member 61, a second solenoid SL2 configured to drive the second switching member 82, and a surface reverse sensor 53 described later are connected to the control portion 120. Further, the image reading portion 100 provided in the image reading device 70, the automatic original feeder 71, and a memory M configured to store the information on the image of the original G which is read by the image reading portion 100 are connected to the control portion 120.

Next, the image forming operation in the laser beam printer 1 (printer main body 1a) having the above-mentioned configuration will be described. When the image forming operation is started, the feed roller 31 first rotates in response to a sheet feed start signal from the control portion 120. Accordingly, the feed roller 31 feeds the sheets S, and the sheets S thus fed are separated one by one by the separation portion 32. After that, each of the sheets S thus separated is conveyed by the conveyance roller pair 40. When a sheet leading edge sensor (not shown) detects the sheet S, a light emitting portion 21 of the laser exposure device 2 irradiates the photosensitive drum 9 with laser light based on the image information.

Note that, when the image forming operation is started, the photosensitive drum 9 rotates and a charging roller (not shown) uniformly charges the surface of the photosensitive drum 9 at a predetermined polarity and potential. When the photosensitive drum 9 after the charging of the surface as described above is irradiated with laser light, an electrostatic latent image is formed on the photosensitive drum 9. Then, the electrostatic latent image is developed with toner supplied from the developing sleeve 8 and visualized as a toner image.

When the sheet S subsequently reaches the transfer portion 1d, the toner image is transferred onto the sheet S due to a bias and pressure applied to the transfer roller 15. After the toner image is transferred as described above, the sheet S is conveyed to the fixing portion 50, in which the sheet S is subjected to heat from a heating roller 51 and pressure of a rotatable pressure roller 52 opposed to the heating roller 51. Accordingly, the toner image is fixed to the sheet S, and the sheet S having the toner image fixed as described above then passes along the sheet discharge conveyance path 22 and is discharged outside the printer main body 1a by the discharge roller pair 60. As a result, the sheet S is stacked on a discharge tray 68 (discharged sheet stacking portion).

Figure 3:
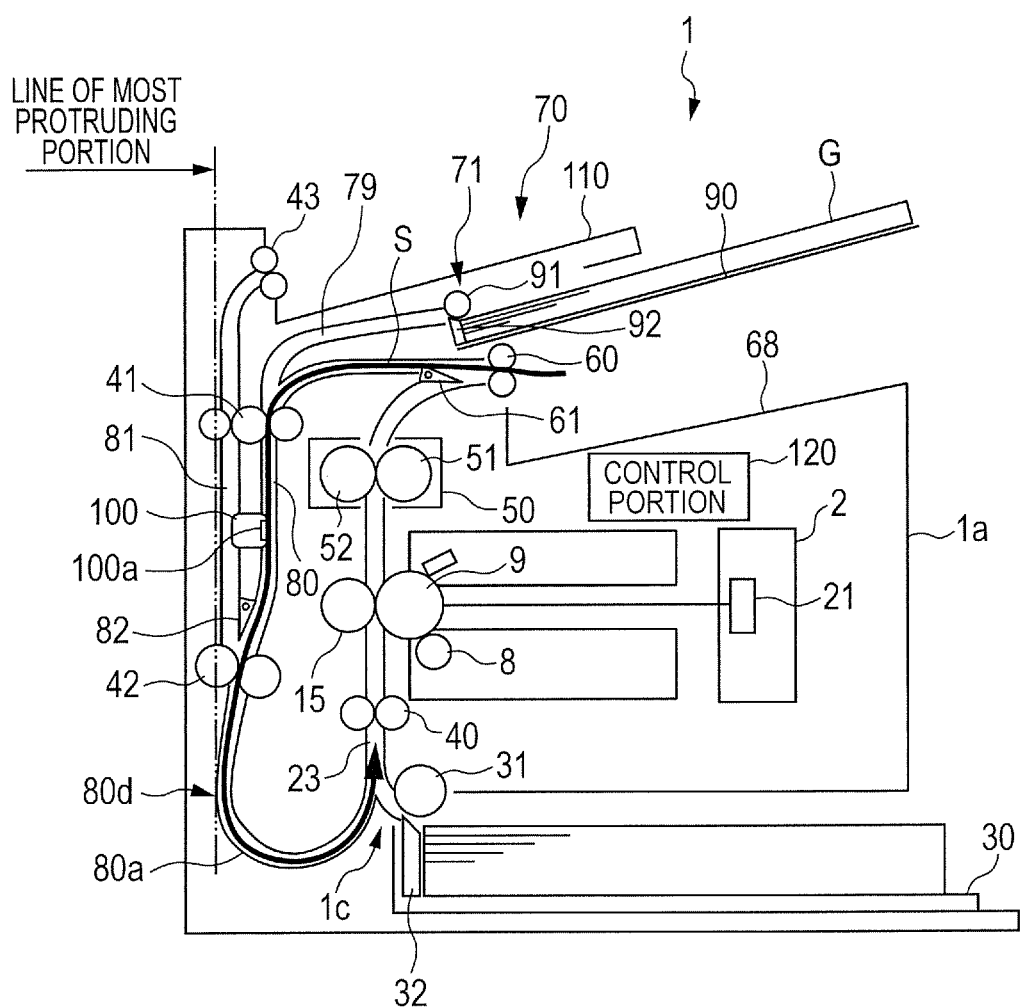
FIG. 3 is an explanatory diagram illustrating an operation of forming an image on a second surface of a sheet, on a first surface of which an image has been formed, in the laser beam printer.

When forming images on both surfaces of the sheet S, on the other hand, based on a detection signal from the surface reverse sensor 53 of FIG. 2 that is provided in the sheet discharge conveyance path 22, the control portion 120 rotates the discharge roller pair 60 in the reverse direction after the trailing edge of the sheet S passes across the branch point between the re-conveying path 80 and the sheet discharge conveyance path 22. Further, the first switching member 61 provided at the branch point is switched clockwise. Through the switchback conveyance performed by the discharge roller pair 60 serving as a switchback conveyance portion, the sheet S having the image formed on the first surface is guided substantially horizontally in the reverse direction with the former trailing edge side as a leading edge with respect to the guiding direction, and enters the re-conveying path 80 as illustrated in FIG. 3.

After that, the sheet S is conveyed by the conveyance roller pairs 41 and 42 provided in the re-conveying path 80, and enters the sheet feeding path 23 from the re-conveying path 80. Accordingly, the sheet S is guided to the conveyance roller pair 40 again in a state in which the front and back surfaces are reversed, and an image is formed on the second surface through an operation similar to the operation of forming an image on the first surface. After that, the sheet S is stacked on the discharge tray 68 by the discharge roller pair 60.

Figure 4A:
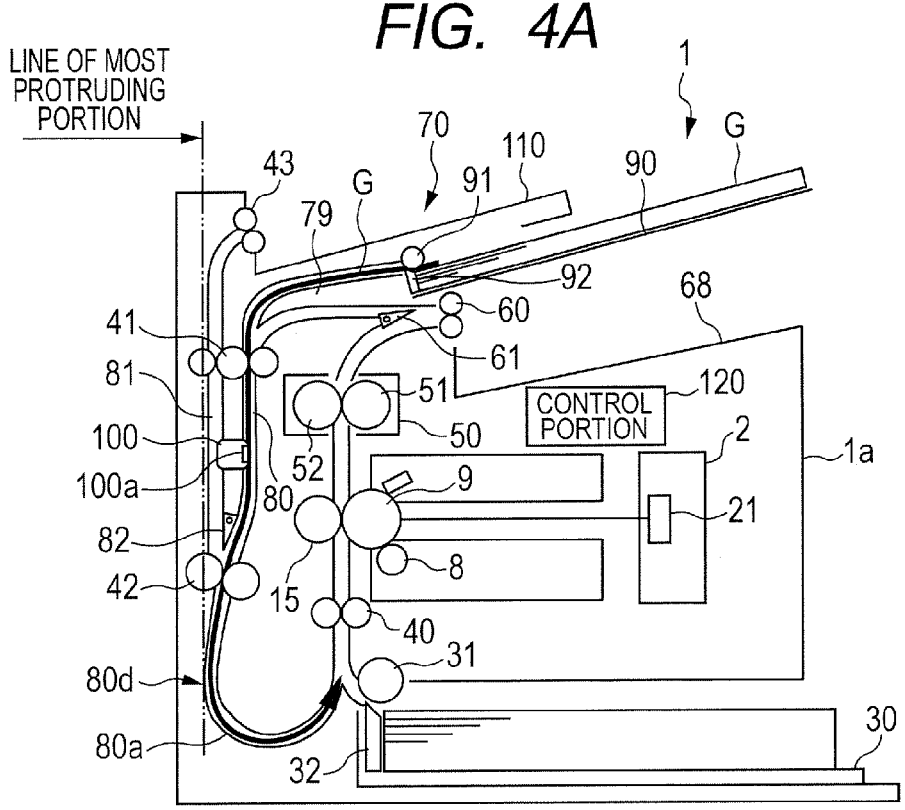
FIGS. 4A and 4B are explanatory diagrams each illustrating an operation of reading an image on a first surface of an original in the laser beam printer.

Next, the image reading operation in the laser beam printer 1 (image reading device 70) will be described. When reading the images of the originals G, the pickup roller 91 is rotated to feed originals G one by one, and then the originals G are separated one by one by the separation portion 92. Then, each of the originals G thus separated is conveyed to the re-conveying path 80 through the original feeding path 79. Then, as illustrated in FIG. 4A, the original G conveyed to the re-conveying path 80 is conveyed to the image reading portion 100 by the conveyance roller pair 41. At this time, the image reading portion 100 moves to the position for reading the image of the original G passing along the re-conveying path 80. Accordingly, when the original G passes across the image reading portion 100, the image reading portion 100 reads the image on the first surface of the original G, and information on the image thus read is recorded in the memory M illustrated in FIG. 2 as image information on the first surface of the original G.

Figure 4B:
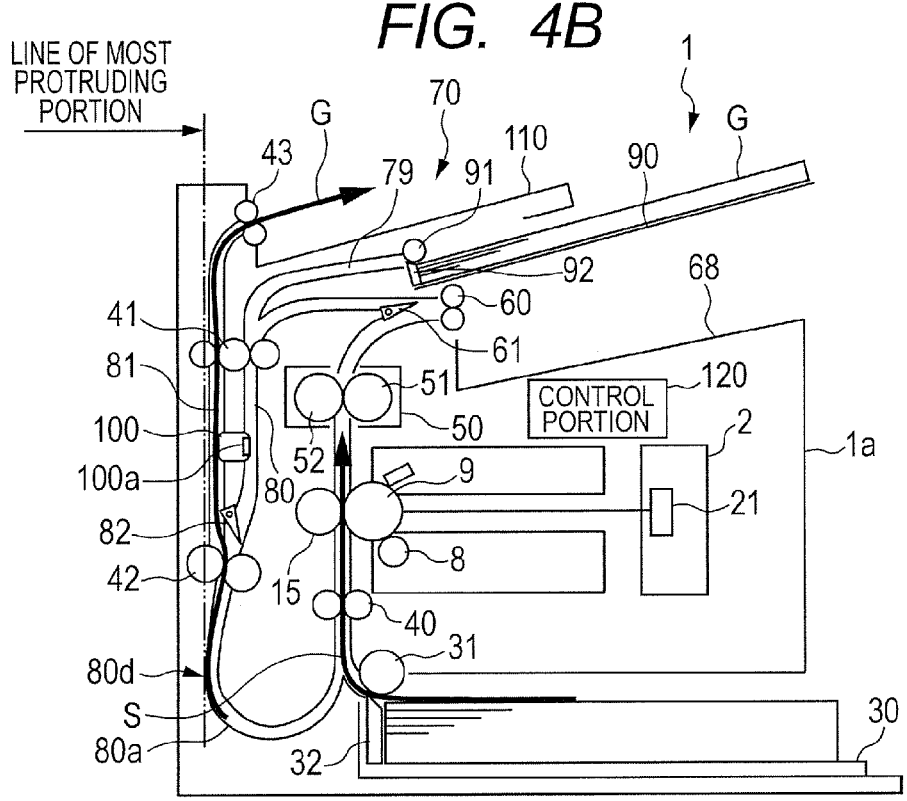

When the trailing edge of the original G after the reading of the image on the first surface then passes across the second switching member 82, the second switching member 82 moves to the position illustrated in FIG. 4B, and the conveyance roller pair 42 rotates in the reverse direction. Accordingly, the original G enters the discharge conveyance path 81, and is then conveyed by the conveyance roller pair 41. The original G conveyed by the conveyance roller pair 41 is discharged onto the discharged original stacking portion 110 by an original discharging roller pair 43 serving as an original discharging portion. The original discharging roller pair 43 is arranged above the image forming portion 1b and the re-conveying path 80

Figure 5:
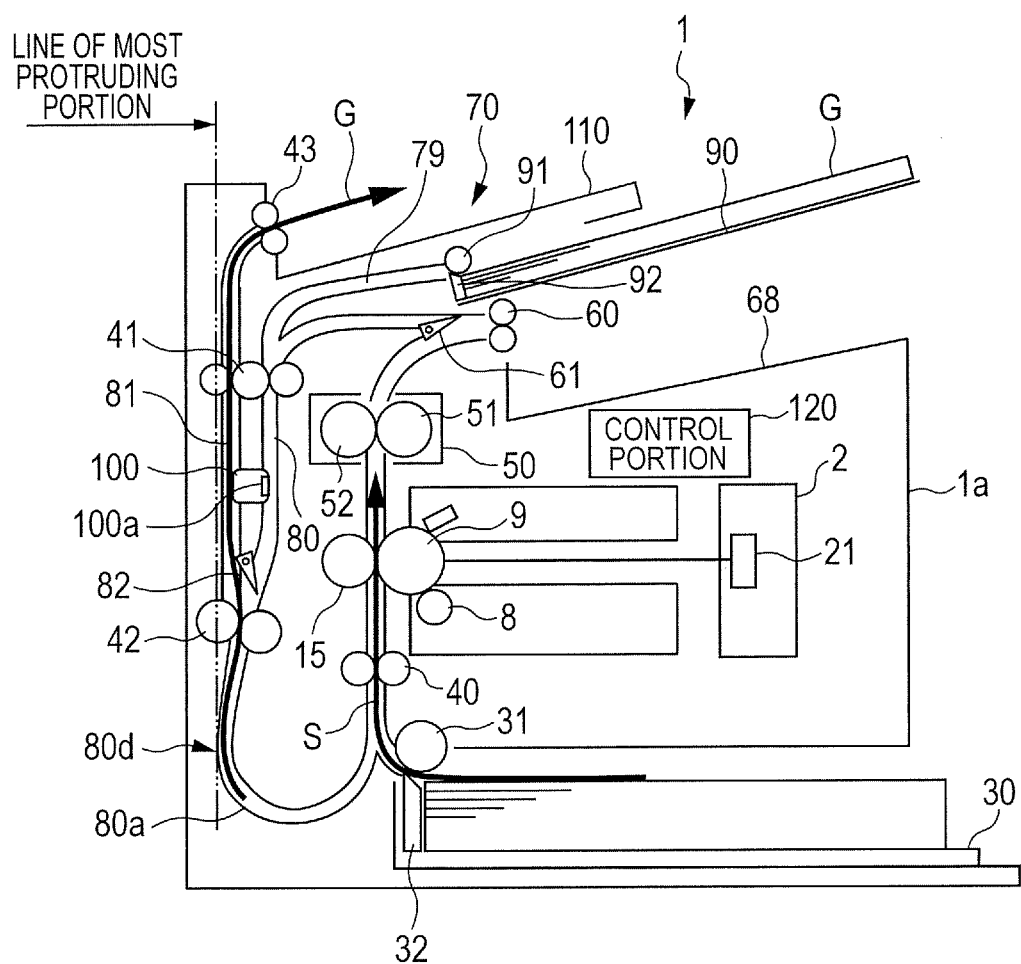
FIG. 5 is an explanatory diagram illustrating an operation of reading an image on a second surface of the original in the laser beam printer.

Further, when reading an image on the second surface of the original G, after the image information on the first surface is read, the image reading portion 100 is moved from the position for reading the image of the original G passing along the re-conveying path 80 to the position of FIG. 5 for reading the image of the original G passing along the discharge conveyance path 81. When the trailing edge of the original G after the reading of the image on the first surface then passes across the second switching member 82, the second switching member 82 is moved to the position illustrated in FIG. 5, and the conveyance roller pair 42 is rotated in the reverse direction.

Accordingly, the original G enters the discharge conveyance path 81, and is conveyed to the image reading portion 100. When the original G passes across the image reading portion 100, the image reading portion 100 reads the image on the second surface, and information on the image thus read is recorded in the memory M illustrated in FIG. 2 as image information on the second surface of the original G. After that, the original G after the reading of the image on the second surface as described above is discharged onto the discharged original stacking portion 110 by the conveyance roller pair 41 and the original discharging roller pair 43.

Note that, when a user selects a copy mode, the light emitting portion 21 irradiates the photosensitive drum 9 with laser light based on the information recorded in the memory M, but when the user does not select the copy mode, the information is transmitted to a computer as electronic data.

By the way, at a part of the re-conveying path 80 which is located on the downstream side in the sheet conveying direction, there is provided a U-turn portion 80a serving as a curved portion configured to guide, to the sheet feeding path 23, the sheet S having the image formed on the first surface. Note that, when reading an image, the leading edge portion of the original G also enters the U-turn portion 80a as illustrated in, for example, FIG. 4A. Therefore, in the embodiment, the curvature radius of the U-turn portion 80a is set to a predetermined value in consideration of conveyance performance of a sheet and original having high rigidity (high stiffness), such as thick paper.

Further, in the embodiment, the discharge conveyance path 81 is arranged on an inner side of the apparatus with respect to a vertical line passing through the outermost portion 80d of the U-turn portion 80a which bulges outward (line of most protruding portion). The discharge conveyance path 81 extends along a part of the re-conveying path 80 (an upstream portion of the re-conveying path 80) which is located on the upstream side in the sheet conveying direction with respect to the U-turn portion 80a. Still further, the image reading portion 100 is arranged along the part of the re-conveying path 80 (an upstream portion of the re-conveying path 80) which is located on the upstream side in the sheet conveying direction with respect to the U-turn portion 80a. Through the arrangement of the discharge conveyance path 81 and the image reading portion 100 at the respective positions as described above, at least a part of the image reading portion 100 may be provided on the inner side of the printer main body 1a with respect to the line of the most protruding portion. Accordingly, the effect of the image reading portion 100 on the size of the laser beam printer 1 may be reduced, and thus the laser beam printer 1 including the image reading device 70 may be downsized. The discharge conveyance path 81 extends along the part of the re-conveying path 80 (the upstream portion of the re-conveying path 80) which is located on the upstream side in the sheet conveying direction with respect to the U-turn portion 80a. Thus, through the arrangement of the pickup roller 91 and the original discharging roller pair 43 on the upper side of the printer, it is possible to prevent the increase in size of the printer while maintaining high visibility of the original for the user. Note that, the inner side of the printer main body 1a herein refers to a side on which the sheet feeding path 23, that is, the image forming portion 1b is provided.

Specifically, in the embodiment, the U-turn portion 80a is shaped to bulge in an outward direction of the printer main body 1a, that is, a direction away from the sheet conveying paths (sheet feeding path 23 and sheet discharge conveyance path 22). Further, the image reading portion 100 is arranged at a position above the bulging portion of the U-turn portion 80a and on the inner side of the printer main body 1a with respect to the bulging portion of the U-turn portion 80a. As a result, the laser beam printer 1 may be downsized.

By the way, in the embodiment, the U-turn portion 80a needs to guide the sheet S so as to change the sheet conveying direction by 180 degrees, and hence the U-turn portion 80a bulges in the direction away from the sheet conveying paths (sheet feeding path 23 and sheet discharge conveyance path 22) in consideration of the conveyance performance of the sheet S and the original G. On the other hand, the path ranging from the discharge roller pair 60 to the image reading portion 100 only needs to be arranged so as to change the sheet conveying direction by 90 degrees. Thus, the part of the re-conveying path 80 which is located on the upstream side in the sheet conveying direction with respect to the U-turn portion 80a does not need to be bulged greatly away from the fixing portion 50 toward the outer side of the apparatus in the horizontal direction. As a result, the part of the re-conveying path 80 which is located on the upstream side in the sheet conveying direction with respect to the U-turn portion 80a may be provided on the inner side of the printer main body 1a with respect to the line of the most protruding portion of the U-turn portion 80a in the horizontal direction.

In the following, modification examples of the first embodiment will be described. Note that, in any of the following three modification examples, detailed description of components similar to those in the first embodiment is omitted herein.

Figure 8:
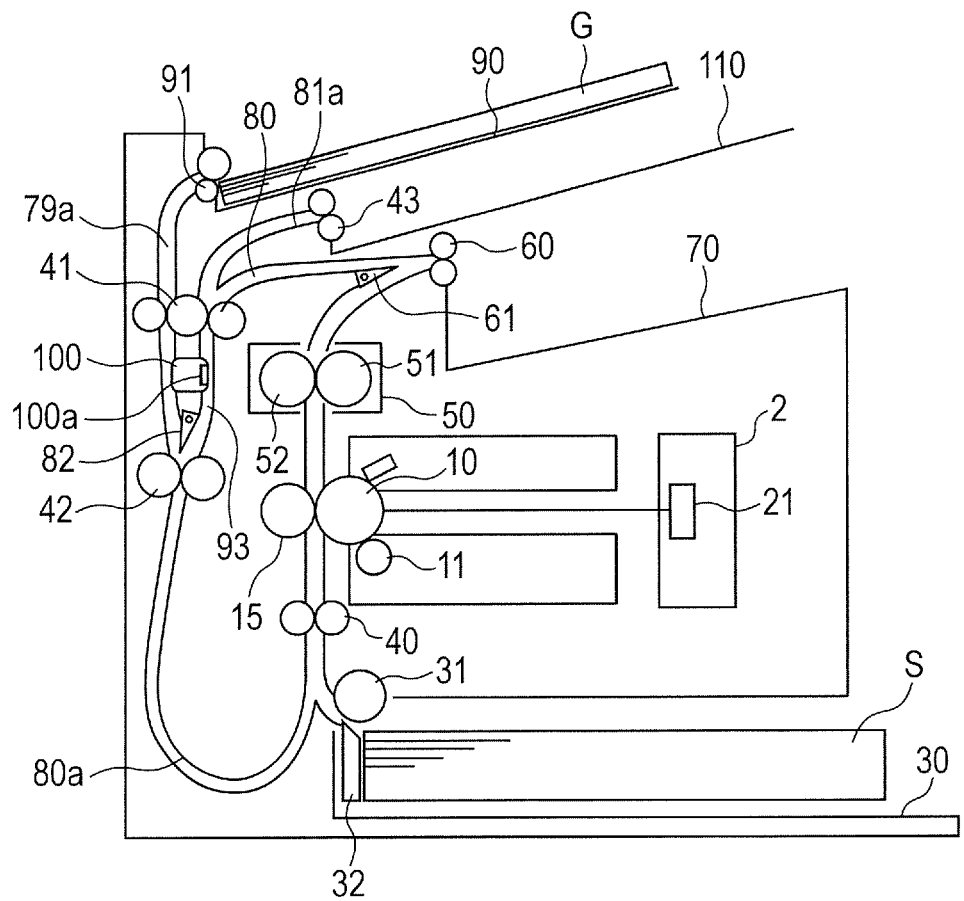
FIG. 8 is a diagram illustrating a configuration according to a first modification example.

FIG. 8 illustrates a first modification example of the first embodiment. In the first modification example, the original tray 90 is arranged above the discharged original stacking portion 110. The original G fed from the original tray 90 by the pickup roller 91 serving as the original feeding portion is guided and conveyed downward along an original feeding path 79a, thereby entering a re-conveying path 93. The conveyance direction of the original G is switched to an upward direction by the conveyance roller pair 42 (in a state in which the front and back surfaces are reversed), and the original G is discharged by the original discharging roller pair 43 from the re-conveying path 93 onto the discharged original stacking portion 110 via a discharge conveyance path 81a serving as the original discharging path.

Figure 9:
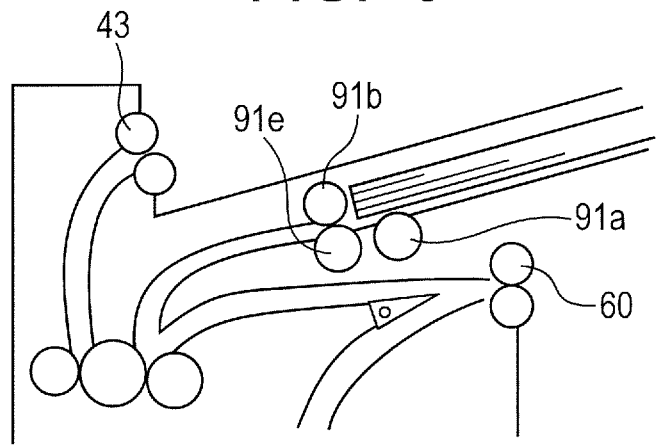
FIG. 9 is a diagram illustrating a configuration according to a second modification example.

FIG. 9 illustrates a second modification example of the first embodiment. In the second modification example, the original feeding portion configured to feed the original G from the original tray 90 is configured to separate and feed the lowermost original on the original tray 90. Specifically, the original feeding portion includes a pickup roller 91a configured to feed the lowermost original in contact with the lowermost original, an original feeding roller 91e, and a separation roller 91b configured to separate the lowermost original in cooperation with the original feeding roller 91e.

Figure 10:
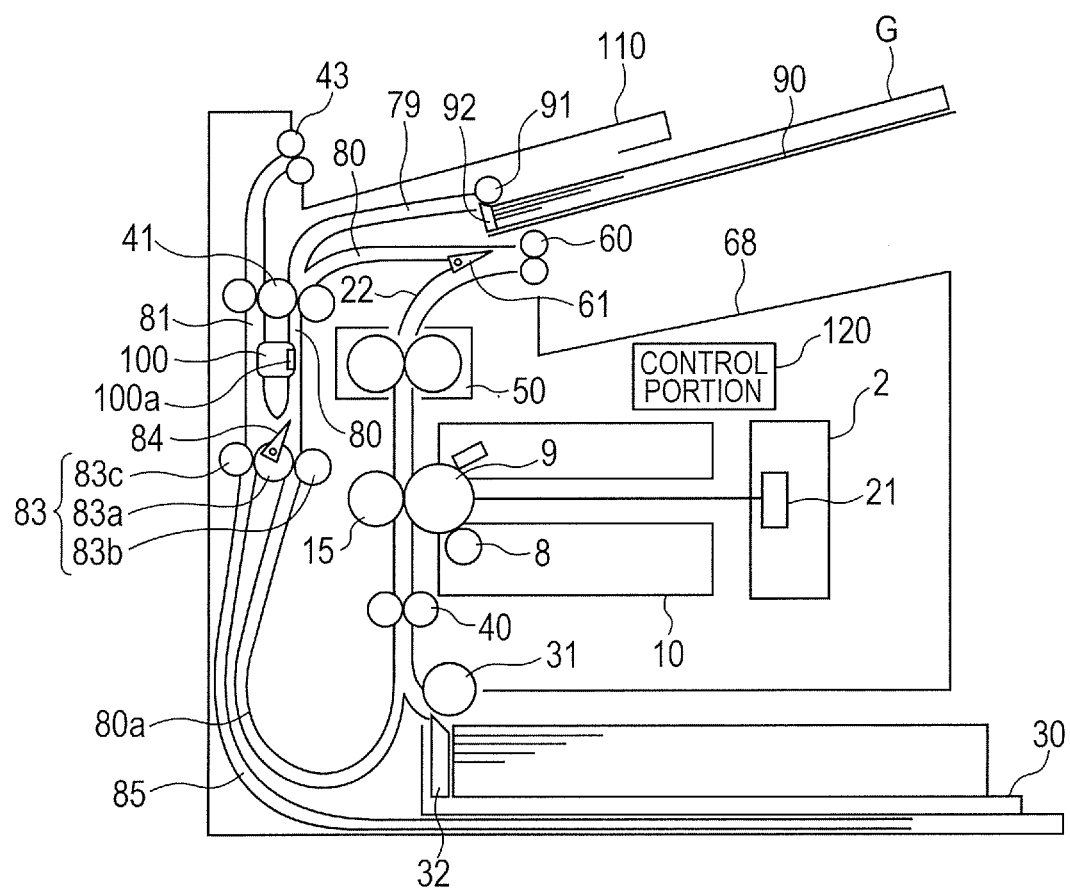
FIG. 10 is a diagram illustrating a configuration according to a third modification example.

FIG. 10 illustrates a third modification example of the first embodiment. In the third modification example, the conveyance path configured to guide the original G is branched off from the re-conveying path 80 before switching the conveyance direction of the original G. Specifically, the third modification example is different from the first embodiment in that a reverse conveyance path 85 is provided.

As illustrated in FIG. 10, the reverse conveyance path 85 extends downward substantially in parallel to the U-turn portion 80a, and is then curved at a downstream end to extend under the sheet feeding tray 30. The reverse conveyance path 85 guides downward the original G moving along the re-conveying path 80 without causing the original G to enter the U-turn portion 80a.

A triple roller 83 is provided on the upstream side of the reverse conveyance path 85 in the original feeding direction. The triple roller 83 includes a driving roller 83a, and a rolling element 83b and a rolling element 83c provided on both sides of the driving roller 83a. The triple roller 83 drives the driving roller 83a to rotate in the forward direction so that the driving roller 83a and the rolling element 83b convey the sheet S toward the downstream side in the sheet conveying direction (in the downward direction of FIG. 10). Further, the triple roller 83 drives the driving roller 83a to rotate in the forward and reverse directions so as to convey the original G and reverse the surfaces of the original G guided to the reverse conveyance path 85 by a pivot guide 84.

When the sheet S moves along the re-conveying path 80, the pivot guide 84 guides the sheet S to a nip between the driving roller 83a and the rolling element 83b. The sheet S is conveyed to the U-turn portion 80a through the nip between the driving roller 83a and the rolling element 83b.

When the original G moves along the re-conveying path 80, the pivot guide 84 guides the original G to a nip between the driving roller 83a and the rolling element 83c. The original G is conveyed to the reverse conveyance path 85 through the nip between the driving roller 83a and the rolling element 83c, and is then switched back. When the original G is switched back by the driving roller 83a and the rolling element 83c, the pivot guide 84 guides the original G to the discharge conveyance path 81.

Specifically, the original G passing the image reading portion 100 so that the image on the first surface is read is conveyed to the reverse conveyance path 85 by the pivot guide 84, and the driving roller 83a, and the rolling element 83c. When the trailing edge of the original G conveyed to the reverse conveyance path 85 passes the pivot guide 84, the control portion 120 rotates the driving roller 83a in the opposite direction so as to switch the original conveying direction to an upward direction. Further, the control portion 120 pivots the pivot guide 84 counterclockwise so as to guide the reversed and conveyed original G to the discharge conveyance path 81. The original G is switched back, and is conveyed toward the discharge conveyance path 81 so that the original G is discharged by the original discharging roller pair 43. The original G discharged by the original discharging roller pair 43 is stacked on the discharged original stacking portion 110. Similarly to the first embodiment, the image reading portion 100 reads the image of the original G during a period in which the original G passes along the discharge conveyance path 81.

The features of the first to third modification examples may be combined together. Specifically, for example, the original G may be fed in the order from the lowermost original as in the second modification example, and the reverse conveyance path 85 branched off from the re-conveying path 80 may be provided as in the third modification example so as to guide the original G before the front and back surfaces are reversed.

Figure 6:
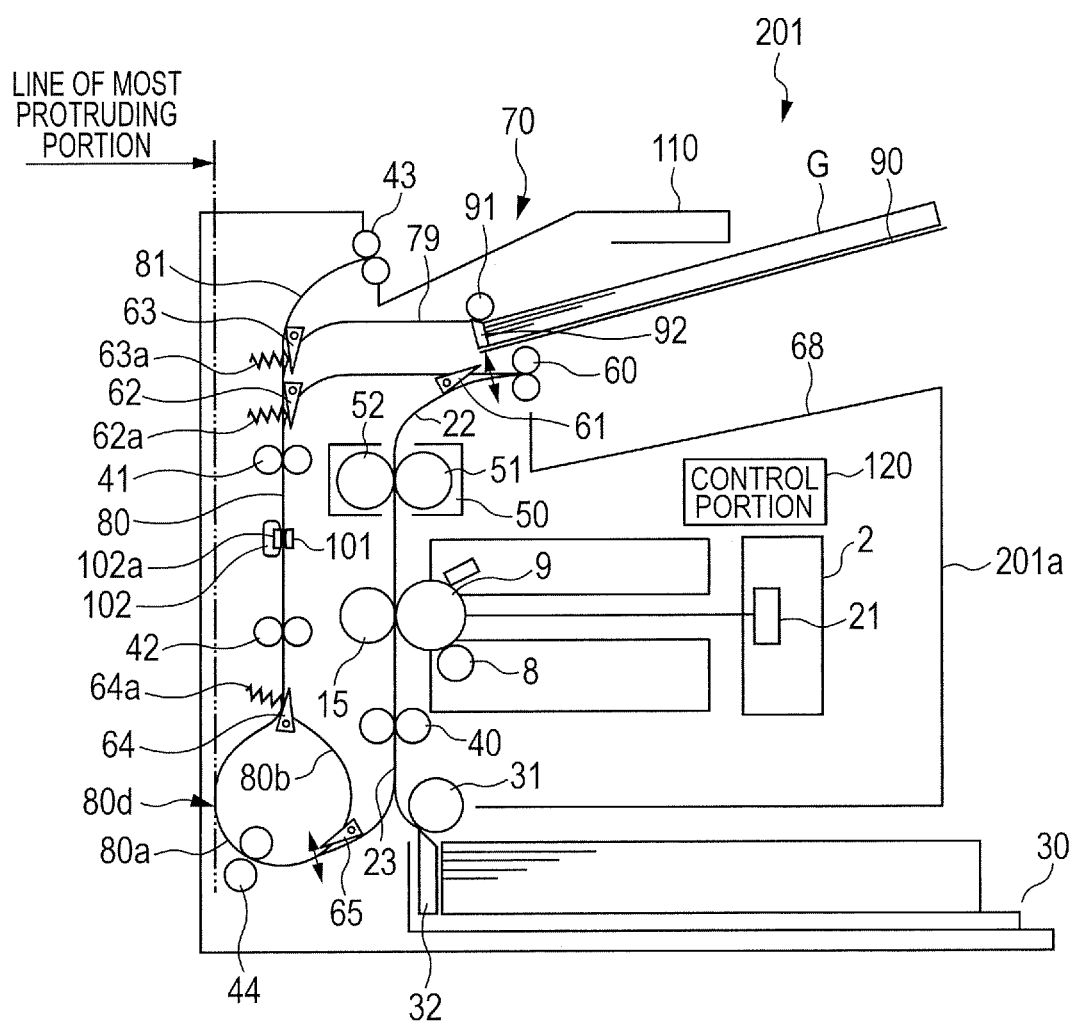
FIG. 6 is a diagram illustrating a schematic configuration of a laser beam printer as an example of an image forming apparatus according to a second embodiment of the present invention.

Next, a second embodiment of the present invention will be described. In the second embodiment, images on both surfaces of the original G are read in a state in which the image reading portion 100 is fixed. FIG. 6 is an explanatory diagram illustrating a configuration of a laser beam printer 201 as an example of an image forming apparatus according to the embodiment. Note that, in FIG. 6, the same reference symbols as those in FIG. 1 described above represent the same or corresponding portions.

In FIG. 6, an image reading portion 102 serving also as a cover configured to prevent entry of a foreign matter has an image reading surface 102a and a white reference member 101 disposed opposite to the image reading surface 102a. A joining path 80b is branched off from the U-turn portion 80a of the re-conveying path 80, and joins the re-conveying path 80. A conveyance roller pair 44 configured to convey the original G is provided in the U-turn portion 80a. A third switching member 65 is provided at a branch point between the joining path 80b and the U-turn portion 80a. Note that, when reading the image on the second surface of the original G, the control portion 120 controls the third switching member 65 to move in such a direction that the original G of which the image on the first surface has been read enters the joining path 80b.

Further, a fourth switching member 62 and a fifth switching member 63 are biased by springs 62a and 63a, respectively, so as to guide the original G of which the image has been read to the discharged original stacking portion 110. A sixth switching member 64 is biased by a spring 64a so as to guide the original G of which the image has been read to the U-turn portion 80a.

When the sheet S enters a joining portion between the re-conveying path 80 and the discharge conveyance path 81, the fourth switching member 62 is pressed by the sheet S, and is pivoted against the biasing force of the spring 62a in such a direction that the sheet S enters the re-conveying path 80. When the original G passing along the original feeding path 79 enters a joining portion between the original feeding path 79 and the discharge conveyance path 81, the fifth switching member 63 is pressed by the original G, and is pivoted against the biasing force of the spring 63a in such a direction that the original G is allowed to pass. When the original G passing along the joining path 80b enters the re-conveying path 80, the sixth switching member 64 is pressed by the original G, and is pivoted against the biasing force of the spring 64a in such a direction that the original G enters the re-conveying path 80. Note that, in the embodiment, the conveyance roller pairs 41 and 42, which serve as the original conveying portion configured to reverse the conveying direction of the original G from the original feeding path 79 to convey the original G toward the discharge conveyance path 81 in cooperation with the U-turn portion 80a, the joining path 80b and the conveyance roller pair 44, are rotatable in the forward and reverse directions.

When the laser beam printer 201 (printer main body 201a) having the above-mentioned configuration forms images on both surfaces of the sheet S, the discharge roller pair 60 is rotated in the reverse direction after the trailing edge of the sheet S having the image formed on the first surface passes the branch point between the re-conveying path 80 and the sheet discharge conveyance path 22. Further, the first switching member 61 is switched clockwise. Accordingly, the sheet S having the image formed on the first surface is conveyed in the reverse direction with the former trailing edge as a leading edge with respect to a conveying direction to enter the re-conveying path 80 while pivoting the fourth switching member 62. After that, the sheet S is conveyed by the conveyance roller pairs 41 and 42, and enters the sheet feeding path 23 after passing across the sixth switching member 64 and the third switching member 65. Accordingly, the sheet S is guided to the conveyance roller pair 40 again in a state in which the front and back surfaces of the sheet S are reversed, and an image is formed on the second surface through an operation similar to the operation of forming an image on the first surface. After that, the sheet S is stacked on the discharge tray 68 by the discharge roller pair 60.

On the other hand, when the laser beam printer 201 (image reading device 70) reads images of the originals G, the pickup roller 91 is first rotated to feed the originals G, and then the originals G are separated by the separation portion 92 one by one. Then, the original G conveyed to the re-conveying path 80 is conveyed to the image reading portion 102 by the conveyance roller pair 41. When the original G passes the image reading portion 102, the image reading portion 102 reads the image on the first surface of the original G. After that, the original G passes the sixth switching member 64, and enters the U-turn portion 80a.

Note that, at this time, the control portion 120 controls the third switching member 65 to move in such a direction that the original G enters the joining path 80b serving as an original guiding path configured to guide the original G to the re-conveying path 80. Accordingly, the original G passing along the U-turn portion 80a enters the joining path 80b, and is then guided to the re-conveying path 80 again while pivoting the sixth switching member 64. The conveyance roller pair 42 is then reversely rotated to convey the original G to the image reading portion 102. When reading the image on the second surface of the original G during a period in which the original G passes the image reading portion 102, the image reading portion 102 selectively reads the image on the second surface of the original G. Subsequently, the conveyance roller pair 41 is reversely rotated to cause at least the original G of which the image on the first surface has been read to pass the fourth switching member 62 and the fifth switching member 63, and enters the discharge conveyance path 81. As a result, the original G is discharged onto the discharged original stacking portion 110 by the original discharging roller pair 43. The direction in which the sheet discharging roller pair 60 discharges the sheet is the same as the direction in which the original discharge roller pair 43 discharges the original. And the direction in which the pickup roller 91 feeds the original is opposite to the direction in which the original discharge roller pair 43 discharges the original.

As described above, with the configuration of the embodiment, the images on both surfaces of the original G may be read even in the state in which the image reading portion 102 is fixed, with the result that the configuration of the image reading device 70 is simplified. Note that, also in the embodiment, the image reading portion 102 is arranged at a position above the bulging portion of the U-turn portion 80a and on the inner side with respect to the bulging portion of the U-turn portion 80a, and hence the laser beam printer 201 may be downsized.

Figure 7:
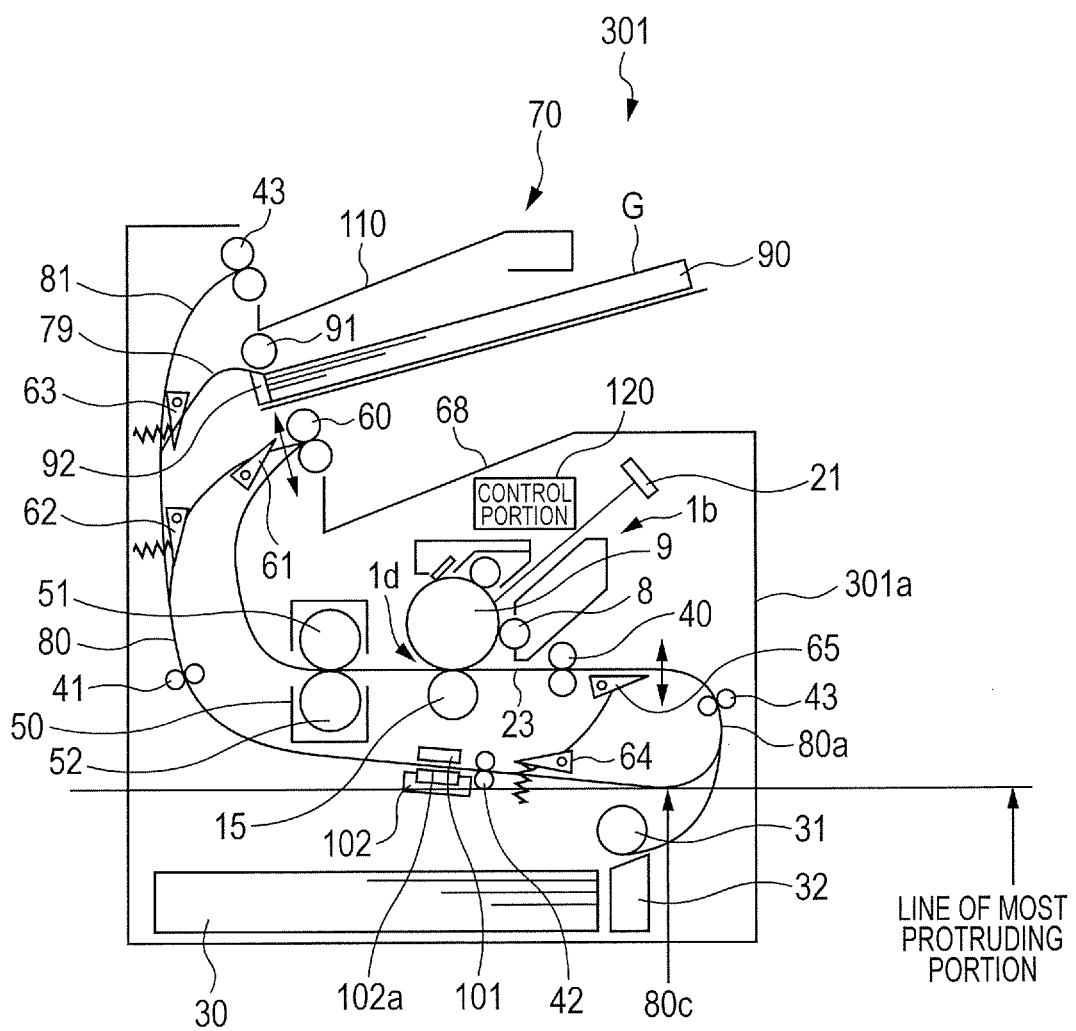
FIG. 7 is a diagram illustrating another configuration of the laser beam printer.

By the way, in the embodiment, the transfer portion 1d and the fixing portion 50 are arranged in the vertical direction in the printer main body 201a, and the sheet feeding path 23 and the re-conveying path 80 are also provided to extend in the vertical direction. However, the present invention is not limited to this configuration. For example, as illustrated in FIG. 7, the transfer portion 1d and the fixing portion 50 may be arranged in the horizontal direction in the printer main body 301a of a laser beam printer 301. In this case, the sheet feeding path 23 extends in the horizontal direction, and a part of the re-conveying path 80 is formed to extend under the transfer portion 1d and the fixing portion 50 along the sheet feeding path 23 in the printer main body 301a.

Also in this case, the image reading portion 102 is arranged at a position above a bulging portion 80c of the U-turn portion 80a and on the inner side with respect to the bulging portion 80c of the U-turn portion 80a. Specifically, at least a part of the image reading portion 102 is arranged above a horizontal line passing through a portion of the bulging portion 80c which is farthest from the image forming portion 1b (or the sheet feeding path 23) in the vertical direction (line of most protruding portion). With this configuration, the laser beam printer 301 may be downsized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106151, filed May 7, 2012, which is hereby incorporated by reference herein in its entirety.

REFERENCE SIGNS LIST

1 . . . laser beam printer,
1a . . . laser beam printer main body,
1b . . . image forming portion,
1c . . . sheet feeding portion,
1d . . . transfer portion,
1e . . . sheet conveying device,
23 . . . sheet feeding path,
41, 42 . . . conveyance roller pair,
50 . . . fixing portion,
70 . . . image reading device,
71 . . . automatic original feeder (ADF),
80 . . . re-conveying path,
80a . . . U-turn portion,
80b . . . joining path,
81 . . . discharge conveyance path,
100, 102 . . . image reading portion,
120 . . . control portion,
G . . . original,
S . . . sheet

The invention claimed is:

1. An image forming apparatus, comprising:
a sheet feeding portion configured to feed a sheet to a sheet conveying path;
an image forming portion configured to form an image on the sheet which is guided along the sheet conveying path;
a sheet discharging portion configured to discharge the sheet on which the image has been formed by the image forming portion;
a sheet re-conveying path configured to guide again, to the sheet conveying path, the sheet on which the image has been formed by the image forming portion;
an original stacking portion provided above the image forming portion and on which an original is stacked;
an original feeding portion configured to feed the original stacked on the original stacking portion;
an original feeding path configured to guide, to the sheet re-conveying path, the original which has been fed by the original feeding portion;
an image reading portion configured to read an image of the original which has been fed by the original feeding portion;
a discharged original stacking portion provided above the image forming portion and on which the original is discharged;
an original discharging portion configured to discharge the original which has been read by the image reading portion to the discharged original stacking portion;
an original discharging path configured to guide, to the original discharging portion, the original which has been guided along the sheet re-conveying path; and
an original conveying portion configured to convey the original which has been fed by the original feeding portion toward the original discharging portion.

2. An image forming apparatus according to claim 1,
wherein the sheet re-conveying path comprises an upstream portion and a U-turn portion that joins the sheet conveying path, the U-turn portion being located on a downstream of the upstream portion in a sheet conveying direction,
wherein the U-turn portion of the sheet re-conveying path comprises a bulging portion which bulges away from the sheet conveying path with respect to the upstream portion of the sheet re-conveying path, and
wherein the image reading portion is arranged along the upstream part of the sheet re-conveying path.

3. An image forming apparatus according to claim 1, wherein the original discharging path is arranged opposite to the sheet conveying path with respect to a common conveying path of the sheet re-conveying path that guides the sheet and the original, and extends along the common conveying path of the sheet re-conveying path.

4. An image forming apparatus according to claim 3, wherein the image reading portion is arranged along the common conveying path of the sheet re-conveying path.

5. An image forming apparatus according to claim 3,
wherein the original discharging path extends along the common conveying path of the sheet re-conveying path, and
wherein the original conveying portion reverses a conveying direction of the original passing along the common conveying path of the sheet re-conveying path so as to convey the original toward the original discharging path.

6. An image forming apparatus according to claim 5, wherein the image reading portion is provided between the sheet re-conveying path and the original discharging path.

7. An image forming apparatus according to claim 6, wherein the image reading portion reads an image on one surface of the original when the original passes along the sheet re-conveying path, and reads an image on other surface of the original when the original passes along the original discharging path.

8. An image forming apparatus according to claim 7, wherein the image reading portion is movable between a position for reading the image on the one surface of the original passing along the sheet re-conveying path and a position for reading the image on the other surface of the original passing along the original discharging path.

9. An image forming apparatus according to claim 1,
wherein the original feeding path is arranged opposite to the sheet conveying path with respect to a common conveying path of the sheet re-conveying path that guides the sheet and the original,
wherein the original feeding path extends along the common conveying path of the sheet re-conveying path which is configured to guide the original, and
wherein the original conveying portion reverses a conveying direction of the original passing along the original feeding path so as to convey the original toward the sheet re-conveying path.

10. An image forming apparatus according to claim 9, wherein the image reading portion is provided between the sheet re-conveying path and the original feeding path.

11. An image forming apparatus according to claim 10, wherein the image reading portion reads an image on one surface of the original when the original passes along the original feeding path, and reads an image on other surface of the original when the original passes along the sheet re-conveying path.

12. An image forming apparatus according to claim 11, wherein the image reading portion is movable between a position for reading the image on the other surface of the original passing along the sheet re-conveying path and a position for reading the image on the one surface of the original passing along the original feeding path.

13. An image forming apparatus according to claim 1,
wherein a downstream end of the original feeding path is connected to the sheet re-conveying path, and
wherein an upstream end of the original discharging path is connected to the sheet re-conveying path.

14. An image forming apparatus according to claim 1, further comprising:
a sheet stacking portion on which the sheet which is discharged by the sheet discharging portion is stacked; and
an original tray which is provided above the sheet stacking portion, and on which the original to be fed by the original feeding portion is placed.

15. An image forming apparatus according to claim 1, wherein the original conveying portion comprises a forward and reverse rotatable roller configured to convey the original forwardly and reversely.

16. An image forming apparatus according to claim 1, wherein the original conveying portion comprises an annular conveyance path configured to reverse a conveying direction of the original so as to convey the original toward the original discharging portion.

17. An image forming apparatus according to claim 1, further comprising a switchback conveyance portion configured to switch back and convey the sheet on which the image has been formed by the image forming portion,
wherein the sheet conveying path guides the sheet upward, and
wherein the sheet re-conveying path guides downward the sheet which has been switched back and conveyed by the switchback conveyance portion, and then causes the sheet to make a U-turn so that the sheet enters the sheet conveying path.

18. An image forming apparatus according to claim 17,
wherein the sheet re-conveying path comprises an upstream portion and a U-turn portion which joins the sheet conveying path, the U-turn portion being located on a downstream of the upstream portion,
wherein the U-turn portion of the sheet re-conveying path comprises a bulging portion which bulges away from the sheet conveying path with respect to the upstream portion of the sheet re-conveying path, and
wherein at least a part of the image reading portion is provided on a side of the sheet conveying path with respect to a vertical line passing through an outermost portion of the bulging portion of the U-turn portion in a horizontal direction.

19. An image forming apparatus according to claim 1,
wherein a common conveying path of the sheet re-conveying path that guides the original and the sheet extends in a vertical direction, and
wherein one of the original feeding path and the original discharging path extends in the vertical direction along the common conveying path of the sheet re-conveying path.

20. An image forming apparatus according to claim 1,
wherein the image reading portion reads an image on one surface of the original conveyed along the sheet re-conveying path before the original conveying portion reverses a conveying direction of the original, and
wherein the image reading portion reads an image on other surface of the original conveyed along the original discharging path after the original conveying portion reverses the conveying direction of the original.

21. An image forming apparatus according to claim 1,
wherein the image reading portion reads an image on one surface of the original conveyed along the original feeding path before the original conveying portion reverses a conveying direction of the original, and
wherein the image reading portion reads an image on other surface of the original conveyed along the sheet re-conveying path after the original conveying portion reverses the conveying direction of the original.

22. An image forming apparatus according to claim 1, wherein the original feeding portion and the original discharging portion are provided above the sheet re-conveying path.

23. An image forming apparatus according to claim 1,
wherein a direction in which the sheet discharging portion discharges the sheet is the same as a direction in which the original discharging portion discharges the original, and
wherein a direction in which the original feeding portion feeds the original is opposite to a direction in which the original discharging portion discharges the original.

* * * * *